(12) United States Patent
Lotter (10) Patent No.: US 10,904,808 B2
(45) Date of Patent: *Jan. 26, 2021

(54) SELECTING RELAY FREQUENCIES IN A REPEATER

(71) Applicant: Nextivity, Inc., San Diego, CA (US)

(72) Inventor: Michiel Petrus Lotter, San Diego, CA (US)

(73) Assignee: NEXTIVITY, INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/012,089

(22) Filed: Jun. 19, 2018

(65) Prior Publication Data

US 2018/0376391 A1    Dec. 27, 2018

Related U.S. Application Data

(60) Provisional application No. 62/523,436, filed on Jun. 22, 2017.

(51) Int. Cl.
*H04W 36/06* (2009.01)
*H04B 7/155* (2006.01)
*H04W 72/10* (2009.01)
*H04W 36/30* (2009.01)
*H04W 36/38* (2009.01)

(52) U.S. Cl.
CPC ........ *H04W 36/06* (2013.01); *H04B 7/15542* (2013.01); *H04W 36/30* (2013.01); *H04W 36/38* (2013.01); *H04W 72/10* (2013.01)

(58) Field of Classification Search
None
See application file for complete search history.

(56) References Cited

U.S. PATENT DOCUMENTS

| | | | |
|---|---|---|---|
| 8,559,950 B2 * | 10/2013 | Choi | H04L 5/0007 455/435.1 |
| 9,439,195 B1 * | 9/2016 | Vivanco | H04B 7/15 |
| 10,397,831 B1 * | 8/2019 | Kim | |

(Continued)

OTHER PUBLICATIONS

International Search Report with Written Opinion corresponding to International Patent Application No. PCT/US2018/038247, dated Sep. 19, 2018, 12 pages.

*Primary Examiner* — Michael J Moore, Jr.
(74) *Attorney, Agent, or Firm* — Kilpatrick Townsend & Stockton LLP (57) ABSTRACT

A system includes a repeater and a data processor. The repeater is for relaying data between a base station and a handset. The repeater is configured to receive data from a plurality of cells in a network and relay at least a portion of the received data to a handset on a first channel. The data processor is coupled to the repeater. The data processor is configured to extract, from the received data, network criteria characterizing a priority of different channels in the network. The data processor is configured to determine, based on the extracted network criteria, a second channel based on the priority of different channels and cause the repeater to reconfigure to relay data signals between a second base station and the handset using the second channel. The second channel includes a frequency band. Related apparatus, systems, techniques and articles are also described.

12 Claims, 4 Drawing Sheets

(56) References Cited

U.S. PATENT DOCUMENTS

| | | | |
|---|---|---|---|
| 2013/0195078 A1* | 8/2013 | Kobayashi | H04W 36/0055 370/331 |
| 2014/0003390 A1* | 1/2014 | Gholmieh | H04W 36/24 370/331 |
| 2016/0295471 A1* | 10/2016 | Song | H04W 48/20 |
| 2016/0337889 A1 | 11/2016 | Jung et al. | |
| 2018/0139715 A1* | 5/2018 | Ly | H04W 56/0025 |
| 2018/0192365 A1* | 7/2018 | Feng | H04B 17/309 |
| 2018/0375725 A1* | 12/2018 | Qiu | H04B 7/15542 |
| 2019/0098643 A1* | 3/2019 | Kronestedt | H04W 72/10 |

* cited by examiner

SELECTING RELAY FREQUENCIES IN A REPEATER

CROSS REFERENCE TO RELATED APPLICATION

This application claims priority under 35 U.S.C. § 119 to U.S. provisional patent application No. 62/523,436 filed Jun. 22, 2017, the entire contents of which is hereby expressly incorporated by reference herein.

TECHNICAL FIELD

The subject matter described herein relates to selecting relay frequencies in a repeater.

BACKGROUND

When the number of bands a repeater can relay is fewer than the number of frequency bands supported by a mobile network, an algorithm is needed to instruct the repeater which frequency bands should be relayed. A simple approach is to have a fixed configuration that can be loaded into the repeater that would configure it to relay a specific frequency band or set of frequency bands. But this approach results in a static configuration that does not change as the network conditions change. Furthermore, it may be difficult to select an appropriate configuration to load into the repeater if a number of different configurations are available to select from.

SUMMARY

In an aspect, a system includes a repeater and a data processor. The repeater is for relaying data between a base station and a handset. The repeater is configured to receive data from a plurality of cells in a network and relay at least a portion of the received data to a handset on a first channel. The data processor is coupled to the repeater. The data processor is configured to extract, from the received data, network criteria characterizing a priority of different channels in the network. The data processor is configured to determine, based on the extracted network criteria, a second channel based on the priority of different channels and cause the repeater to reconfigure to relay data signals between a second base station and the handset using the second channel. The second channel includes a frequency band.

One or more of the following features can be included in any feasible combination. For example, the network criteria can include a cell reselection priority value. The network criteria can include cell selection criteria broadcast by the network to the handset. The network criteria can include global system for mobile communication (GSM) enhanced data rates for GSM evolution (EDGE) radio access network (GERAN) frequencies and/or GERAN neighbor cell frequencies contained within a system information block (SIB) message 7. The network criteria can include cell reselection criteria broadcast by the network to the handset. The network criteria information can include inter frequency neighbor information contained within system information block (SIB) message 5. The network criteria information can include cell reselection priority and/or intrafrequency cell reselection information contained within a system information block (SIB) message 3.

The repeater can further comprise a radio frequency transceiver. The repeater can be configured to measure, by the radio frequency transceiver, signal strengths associated with the different channels. The determining can be further based on the measured signal strengths.

The network criteria can be broadcast from a base station for reception by the handset over a logical channel broadcast control channel (BCCH), transport channel broadcast channel (BCH), or downlink shared channel (DL-SCH).

The determining can include executing, by the repeater, a handset cell reselection procedure using the extracted network criteria. The data processor can be further configured to identify cells and frequency bands available for repeating by the repeater, and measure, by a radio frequency transceiver, signal strengths associated with the different channels. The determining can include executing, by the data processor, a handset cell reselection procedure for each of the identified available cells and each of the identified available frequency bands, the executing using at least the extracted network criteria, the measured signal strengths, and signal quality measures. The determining can further include ranking the identified cells according to results of the cell reselection procedure executions, constructing a list of frequency bands prioritized according to the ranked identified cells; and selecting a frequency band within the list of frequency bands as the second channel.

In another aspect, a method includes relaying, by a repeater and using a first channel, a data signal between a first base station and a handset; extracting, from the data signal, network criteria characterizing a priority of different channels in a network; determining, based on the extracted network criteria, a second channel; and reconfiguring the repeater to relay data signals between a second base station and the handset using the second channel, the second channel including a frequency band.

One or more of the following features can be included in any feasible combination. For example, the network criteria can include a cell reselection priority value. The network criteria can include cell selection criteria broadcast by the network to the handset. The network criteria can include global system for mobile communication (GSM) enhanced data rates for GSM evolution (EDGE) radio access network (GERAN) frequencies and/or GERAN neighbor cell frequencies contained within a system information block (SIB) message 7.

The network criteria can includes cell reselection criteria broadcast by the network to the handset. The network criteria can include inter frequency neighbor information contained within system information block (SIB) message 5. The network criteria can include cell reselection priority and/or intrafrequency cell reselection information contained within a system information block (SIB) message 3.

The method can further include measuring, by a radio frequency transceiver, signal strengths associated with the different channels. The determining can be further based on the measured signal strengths.

The network criteria can be broadcast from a base station for reception by the handset over a logical channel broadcast control channel (BCCH), transport channel broadcast channel (BCH), or downlink shared channel (DL-SCH).

The determining can include executing, by the repeater, a handset cell reselection procedure using the extracted network criteria. The method can further include: identifying cells and frequency bands available for repeating by the repeater; and measuring, by a radio frequency transceiver, signal strengths associated with the different channels. The determining can include executing, by the repeater, a handset cell reselection procedure for each of the identified available cells and each of the identified available frequency bands. The executing can use at least the extracted network criteria, the measured signal strengths, and signal quality measures. The determining can further include: ranking the identified cells according to results of the cell reselection procedure executions; constructing a list of frequency bands prioritized according to the ranked identified cells; and selecting a frequency band within the list of frequency bands as the second channel.

In some aspects, the current subject matter dynamically selects the channels to be boosted by examining network criteria broadcast by the network to handsets. In some implementations, measurements made of signal strength by the repeater can also be used to select the channels to be boosted. For example, a repeater can dynamically select a channel to relay using the Cell Selection and Cell Reselection criteria broadcast by the network to handsets, coupled with measurements made of the signal strengths by the repeater.

In an aspect, a system includes a repeater and a data processor. The repeater is for relaying data between a base station and a handset. The repeater configured to receive data from a plurality of cells in a network and relay at least a portion of the received data to a handset on a first channel. The data processor is coupled to the repeater. The data processor is configured to extract, from the received data, network criteria characterizing a priority of different channels in the network. The data processor is configured to dynamically determine, based on the extracted network criteria, a second channel based on the priority of different channels and cause the repeater to reconfigure to relay data signals between a second base station and the handset using the second channel. The second channel being a frequency band.

The network criteria can include a cell reselection priority value.

In another aspect, a data signal is relayed by a repeater between a first base station and a handset. Network criteria characterizing a priority of different channels in a network are extracted from the data signal. A second channel is dynamically determined based on the extracted network criteria. The repeater is reconfigured to relay data signals between a second base station and the handset using the second channel. The second channel being a frequency band.

In another aspect, a system includes a repeater and a data processor. The repeater is for relaying data between a base station and a handset. The repeater is configured to receive data from a plurality of cells in a network and relay at least a portion of the received data to a handset on a first channel. The data processor is coupled to the repeater. The data processor is configured to execute a cell reselection procedure. The data processor is configured to dynamically determine, based on the cell reselection procedure, a second channel and cause the repeater to reconfigure to relay data signals between a second base station and the handset using the second channel. The second channel being a frequency band.

In another aspect, a data signal is relayed, by a repeater, between a first base station and a handset. A cell reselection procedure is executed. A second channel is dynamically determined, based on the cell reselection procedure. The repeater is reconfigured to relay data signals between a second base station and the handset using the second channel. The second channel being a frequency band.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Another approach to instructing the repeater which frequency bands should be relayed includes having a list of all the possible frequency bands that the network supports and then to make a decision on which frequency band to relay based on signal strength measurements coupled with pre-defined rules on which frequencies should be relayed. But such an approach lacks dynamic behavior. Network conditions may differ based on geography and the optimum repeater configuration may not always be selected by the above-described selection algorithm. This can especially be true for multi-carrier long term evolution (LTE) systems (e.g., Carrier Aggregation systems).

The current subject matter dynamically selects the channels to be boosted by examining network criteria broadcast by the network to handsets. In some implementations, measurements made of signal strength by the repeater can also be used to select the channels to be boosted. For example, a repeater can dynamically select a channel to relay using the Cell Selection and Cell Reselection criteria broadcast by the network to handsets, coupled with measurements made of the signal strengths by the repeater.

Figure 1:
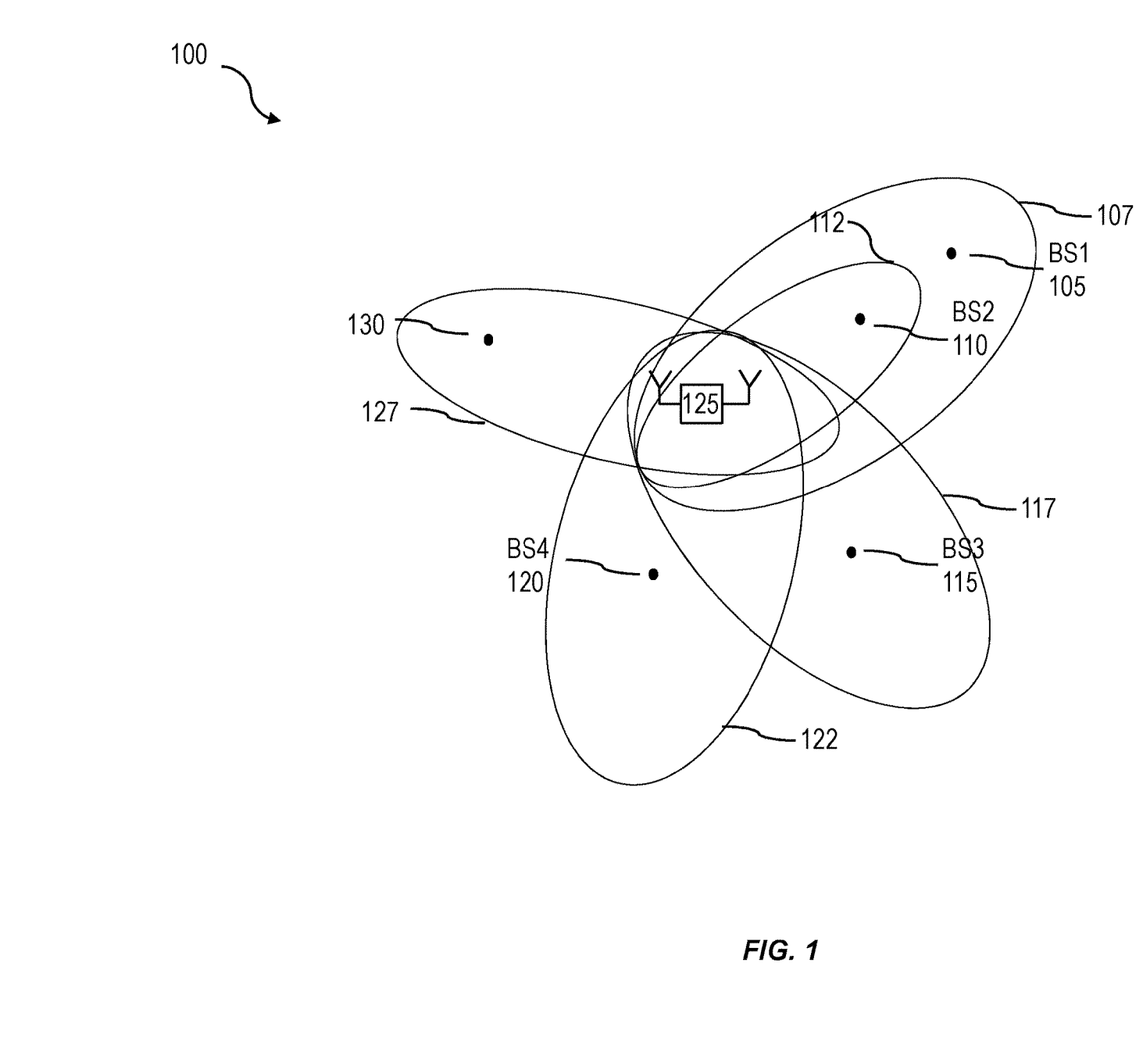
FIG. 1 is a system diagram of an example network.

FIG. 1 is a system diagram of an example network 100. The network 100 includes four base stations 105, 110, 115, 120, which in an LTE network can be referred to as an evolved nodeBs (eNodeBs). Each base station 105, 110, 115, and 120 has a respective cell coverage area 107, 112, 117, and 122. Each base station 105, 110, 115, and 120 can have a different operator and operating frequencies. A repeater 125 is within coverage areas 107, 112, 117, and 122 and is able to boost (e.g., relay) signals received from the base stations 105, 110, 115, 120. The repeater 125 can boost/relay signals within an associated repeater coverage area 127. A user equipment (UE) 130, also referred to as a handset, is within repeater coverage area 127 but not cell coverage areas 107, 112, 117, 122. Repeater 125 can connect UE 130 to one or more base stations 105, 110, 115, 120.

In operation, network criteria is broadcast by the network 100 (e.g., base stations 105, 110, 115, 120) to UE 130. The network criteria can include system information. System information is broadcasted by LTE eNodeBs over logical channel Broadcast Control Channel (BCCH). This logical channel information is further carried over transport channel Broadcast Channel (BCH) or carried by Downlink Shared Channel (DL-SCH). System information includes a Master Information Block (MIB), which is static, and System Information Block (SIB), which is dynamic. MIB carries information including channel bandwidth, PHICH configuration details; transmit power, number of antennas and SIB scheduling information transmitted along with other information on the DL-SCH. SIB is mapped on RRC SI messages (SI-1,2,3,4,5,6,7,8,9,10,11) over DL-SCH and transmitted using PDSCH at periodic intervals.

SIBs are grouped in SI containers. Each SI is composed of multiple SIBs. Each SI usually will have different transmission frequency and will be sent in a single sub-frame. SIBs are transmitted using BCCH mapped on DL-SCH which in turn mapped on PDSCH.

SIB3 carries cell re-selection information as well as Intra frequency cell re-selection information. SIB4 carries Intra Frequency Neighbors; carries serving cell and neighbor cell frequencies required for cell reselection as well handover between same RAT base stations (GSM BTS1 to GSM BTS2) and different RAT base stations (GSM to WCDMA or GSM to LTE or between WCDMA to LTE and the like). The contents of SIB3 are illustrated in table 1:

| Information Elements | | |
|---|---|---|
| Cell Reselection Common Information | Qhyst Mobility State Parameters | Tevaluation T Hyst Normal N Cell Change Medium N Cell Change High |
| | Qhyst Scaling Factors | SF Medium SF High |
| Cell Reselection Serving Frequency Information Intra Frequency Cell Reselection Information | Snon-intrasearch Thresh Serving Low Cell Reselection Priority Qrxlevmin Pmax Sintrasearch Allowed Measurement Bandwidth Presence of Antenna Port 1 Neighbour Cell Configuration Treselection EUTRA | |
| | Treselection EUTRA Scaling Factors | SF Medium SF High |

LTE SIB-3

SIB5 Carries Inter Frequency Neighbors (on different frequency); carries E-UTRA LTE frequencies, other neighbor cell frequencies from other RATs. The purpose is cell reselection and handover. The contents of SIB5 is illustrated in table 2:

| Information Elements | | |
|---|---|---|
| Inter-Frequency Carrier Frequency List (1 to 8 instances) | Downlink Carrier Frequency Qrxlevmin Pmax Treselection EUTRA | |
| | Treselection EUTRA Scaling Factors | SF Medium SF High |
| | Thresh X-High Thresh X-Low Allowed Measurement Bandwidth Presence Antenna Port 1 Priority Neighbour Cell Configuration QofsetFreq | |
| | Inter-Frequency Neighbour Cell List (1 to 16 instances) | Inter- Frequencey Neighbour Cell Information | Physical Cell Identity Qoffset |
| | Inter-Frequency Black Cell List (1 to 16 instances) | Physical Cell Identity Range | Start Range |

LTE SIB-5

SIB7 carries GSM neighbor information such as GERAN frequencies as well as GERAN neighbor cell frequencies. It can be used for cell re-selection as well as handover purpose. The contents of SIB7 is illustrated in table 3:

| Information Elements | | |
|---|---|---|
| Treselection GERAN Treselection GERAN Scaling Factors | Medium Mobility High Mobility | |
| Carrier Frequencies Information List (1 to 16 instances) | Carrier Frequencies | Starting ARFCN Band Indicator Choice 1. Explicit List of ARFCN 2. Equally Spaced ARFCN  ARFCN Spacing  Number of ARFCN 3. Bit Map of ARFCN |
| | Priority NCC Permitted Qrxlevmin Pmax Thresh X-High Thresh X-Low | |

LTE SIB-7

Additional information may be found in described in 3GPP 36.331.

Figure 2:
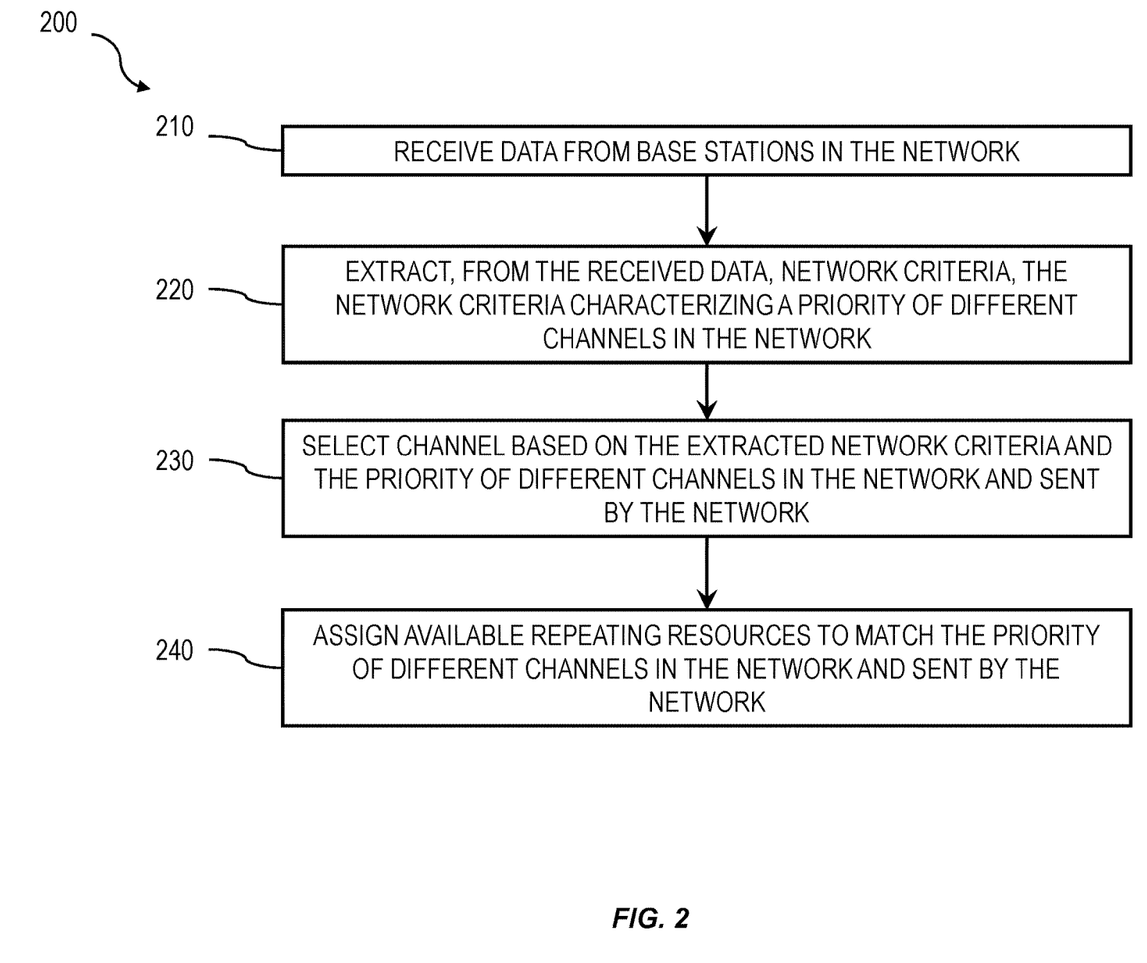
FIG. 2 is a process flow diagram illustrating an example process for a repeater to dynamically select a channel to relay.

FIG. 2 is a process flow diagram illustrating an example process 200 for a repeater 125 to dynamically select a channel to relay. By dynamically selecting a channel to relay, changing network conditions, which can change based on geography and other factors, can be accommodated and the repeater can be configured to settings that improve performance.

At 210, a repeater 125 can receive data from base stations (e.g., base stations 105, 110, 115, 120) in the network 100. The data can be transmitted for a handset (e.g., UE 130) and can include system information. The system information can include, for example, a Master Information Block (MIB), which is static, and System Information Block (SIB), which is dynamic. MIB carries information including channel bandwidth, PHICH configuration details; transmit power, number of antennas and SIB scheduling information transmitted along with other information on the DL-SCH. SIB is mapped on RRC SI messages (SI-1,2,3,4,5,6,7,8,9,10,11) over DL-SCH and transmitted using PDSCH at periodic intervals.

At 220, the repeater 125 can extract, from the received data, network criteria. The network criteria can characterize a priority of different channels in the network. For example, the network criteria can include the CellReselectionPriority Information Element transmitted in SIB3, SIB5 or SIB7 of an LTE network. The network criteria can have been determined by a base station. In some implementations, the network criteria is determined from another component of the telecommunications network. Network criteria can be extracted for some or all cells that the repeater can receive and transmit.

In some implementations, the repeater can extract network criteria from the system information intended for the handset. For example the extraction of network criteria can include inspecting and/or identifying system information SI, which can have different transmission frequency and can be sent in a single sub-frame. The inspection can include identifying and/or inspecting, the PDSCH, DL-SCH, and BCCH to identify transmitted SIBs. The extraction of network criteria can include identifying the MIB.

At 230, the repeater 125 can select a channel to relay. The selecting can include determining, based on the extracted network criteria, a second channel different from the first channel that the repeater is relaying data over. The determination can be based on the priority contained in the network criteria (e.g., within SIB3, SIB5, or SIB7 of an LTE network). Additional channels can be determined. For example, if a repeater can relay a single LTE channel, it can select the channel (e.g., frequency band) containing the highest priority cell. As another example, if a repeater can relay two LTE channels, it can select the two channels to match the frequencies contained in the two highest priority cells.

The repeater 125 can, at 240, assign its available repeating resources based on the selected channel (e.g., which is based on network criteria characterizing the priority of different channels in the network). The assignment of available repeating resources can include reconfiguring the repeater to relay signals on the second channel (e.g., a frequency associated with the priority). For example, if a repeater can relay a single LTE channel, it can configure the relay channel to match the frequency containing the highest priority cell. As another example, if a repeater can relay two LTE channels, it can configure to relay the two channels to match the frequencies contained in the two highest priority cells.

In some implementations, the reconfiguration can be performed by accessing configuration information from a table stored on the repeater 125 or by receiving configuration information from the network.

In some implementations, the process 200 illustrated in FIG. 2 is repeated at intervals to dynamically select frequencies or channels to reconfigure the repeater to adapt to changing network conditions.

Figure 3:
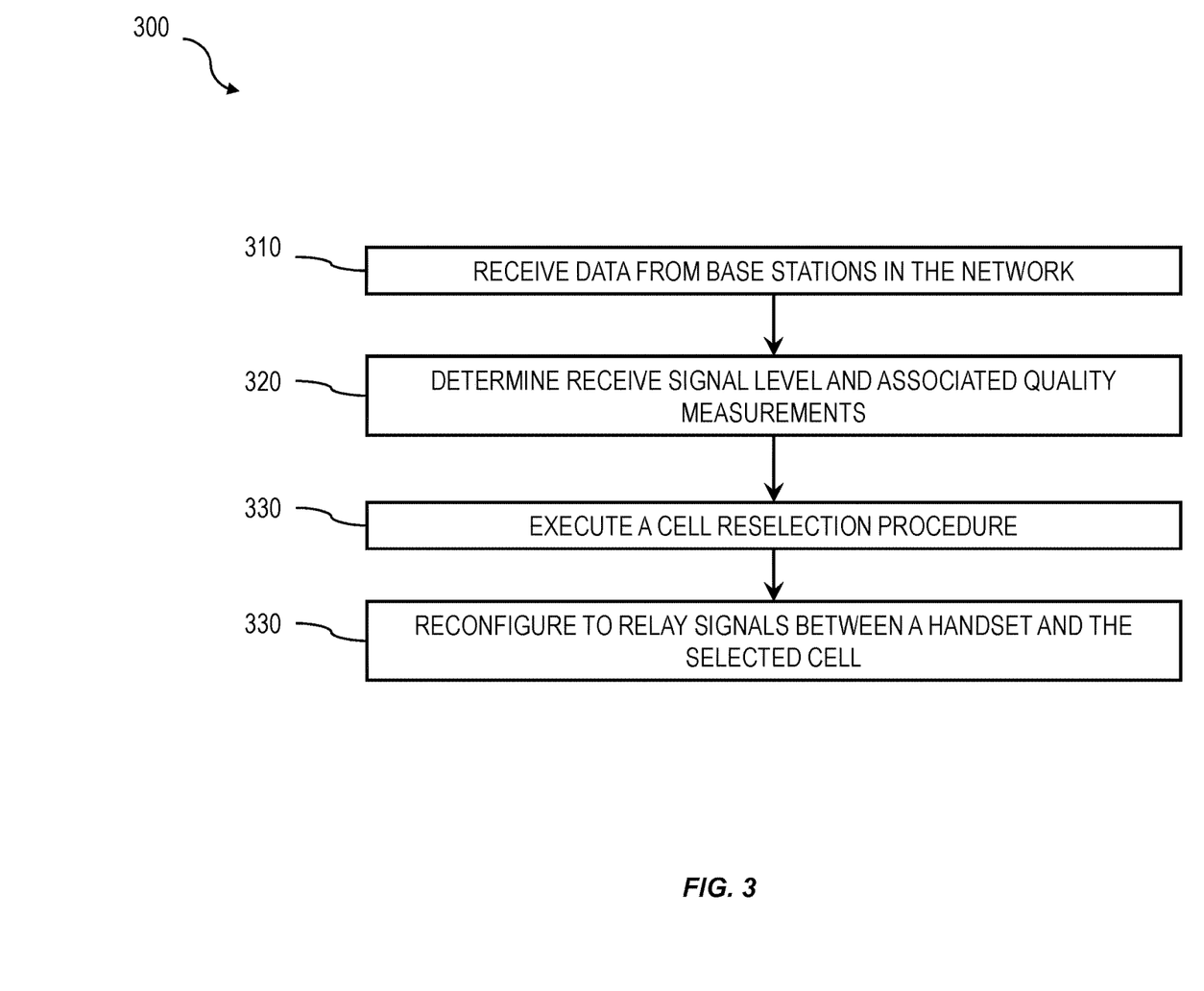
FIG. 3 is a process flow diagram illustrating another example process for a repeater to dynamically select a channel to relay.

FIG. 3 is a process flow diagram illustrating another example process 300 for a repeater 125 to dynamically select a channel to relay. In some implementations, the channels to boost are determined using the Cell Reselection procedure described in 3GPP 36.133.

At 310, a repeater 125 can receive data from base stations (e.g., base stations 105, 110, 115, 120) in the network 100. The data can be transmitted for a handset (e.g., UE 130) and can include system information. In some implementations, the repeater can extract network criteria from the system information intended for the handset. For example, the extraction of network criteria can include inspecting and/or identifying system information SI, which can have different transmission frequency and can be sent in a single sub-frame. The inspection can include identifying and/or inspecting, the PDSCH, DL-SCH, and BCCH to identify transmitted SIBs. The extraction of network criteria can include identifying the MIB.

At 320, the repeater 125 can determine receive signal level and associated quality measurements. The associated quality measurements can include signal to noise ratio, average power from a reference signal (RSRP), receive signal strength indication (RSSI), Reference Signal Received Quality (RSRQ) (the ratio N×RSRP/(E-UTRA carrier RSSI), where N is the number of RB's of the E-UTRA carrier RSSI measurement bandwidth), and the like. Determination of the receive signal level and associated quality measurements can include measurement of these values and/or measurement of one or more related values by an RF transceiver of the repeater.

At 330, the repeater 125 can execute or perform a cell reselection procedure. In some implementations, the cell reselection procedure is a handset cell reselection procedure but is being executed by the repeater, rather than handset. In some implementations, the cell reselection procedure is the Cell Reselection procedure described in 3GPP 36.133. The cell reselection procedure can determine a cell (e.g., base station) to camp on.

The cell reselection calculations can be performed for all neighboring cells and on all frequency bands the repeater is capable of relaying. For example, the repeater can identify or determine whether a frequency band can be relayed. If it can be relayed, the repeater can determine the frequency's priority by executing the cell reselection procedure, which outputs the frequency's priority. The repeater can rank cells according to the results of their respective cell reselection procedure out (e.g., ranked in order of their suitability for a UE to camp on). For example, the best cell can be ranked highest, the second best cell can be ranked second highest, and the like ("best" can be considered based on a number of factors). Once the cells have been ranked, the repeater can construct a list of priority frequencies. Each cell can be mapped to a frequency (the frequency it is on) and then the unique frequencies can be prioritized to follow the cell priorities. The repeater can then use the frequency priority list to select (e.g., determine) the channel (or channels), e.g., frequencies, to relay. An example of this procedure is shown in the tables below.

For example, the repeater can identify or determine whether a frequency band can be relayed and can determine the frequency's priority by executing the cell reselection procedure, which outputs the frequency's priority. The repeater can rank cells according to the results of their respective cell reselection procedure out (e.g., ranked in order of their suitability for a UE to camp on). An example of such a ranking is illustrated in Table 4.

TABLE 4

Cell Reselection Measurements.

| Cell Identity | Cell Reselection Ranking | Cell Frequency |
|---|---|---|
| Cell1 | 1 | Frequency 2 |
| Cell3 | 2 | Frequency 1 |
| Cell2 | 3 | Frequency 2 |
| Cell4 | 4 | Frequency 3 |

Once the cells have been ranked, the repeater can construct a list of priority frequencies. Each cell can be mapped to a frequency (the frequency it is on) and then the unique frequencies can be prioritized to follow the cell priorities. The repeater can then use the frequency priority list to select (e.g., determine) the channel (or channels), e.g., frequencies, to relay. An example of such a list of frequency bands prioritized according to the ranked identified cells is illustrated in Table 5.

TABLE 5

Repeater Frequency Priority List.

| Repeater Frequency Priority List |
|---|
| Frequency 2 |
| Frequency 1 |
| Frequency 3 |

At 340, the repeater 125 can reconfigure to relay signals between a handset and the selected cell. The reconfiguration can be performed by accessing configuration information from a table stored on the repeater 125 or by receiving configuration information from the network. In some implementations, the repeater reconfigures to relay signals on the determined frequencies.

Figure 4:
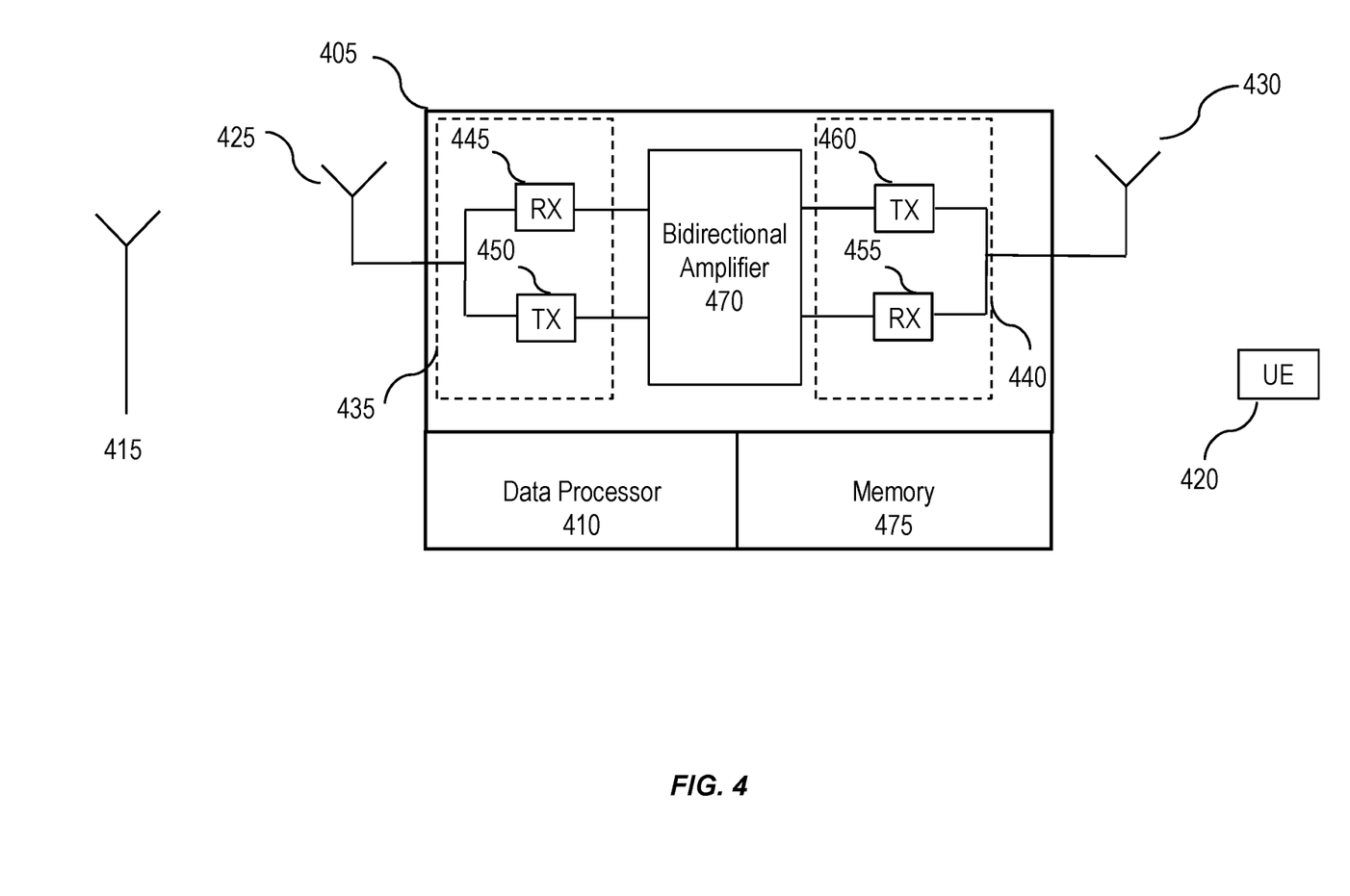
FIG. 4 is a system block diagram illustrating an example repeater coupled to a data processor and capable of repeating or relaying a data signal bi-directionally between a base station and handset.

FIG. 4 is a system block diagram illustrating an example repeater 405 coupled to a data processor 410 and capable of repeating or relaying a data signal bi-directionally between a base station 415 and handset 420. The repeater 405 includes a donor antenna 425 for communicating with the base station 415 and a server antenna 430 for communicating with the handset 420. The repeater 405 includes transceivers 435, 440 connected respectively to the donor antenna 425 and server antenna 430. Transceivers 435, 440 includes receivers 445, 455 and transmitters 450, 460, respectively. Transceivers 435, 440 are coupled via a bi-directional amplifier 470.

Data processor 410 is coupled to the repeater 405 and memory 475 storing configuration files. These configuration files can specify repeater settings or parameters at which to operate the repeater 405 in order to relay signals over different channels (e.g., frequency bands).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system comprising:
a repeater for relaying data between a base station and a handset, the repeater configured to receive data from a plurality of base stations in a network and relay at least a portion of the received data to the handset on a first channel; and
the repeater further comprising a data processor configured to extract, from the received data, network criteria characterizing a priority of different channels in the network, the data processor configured to determine, based on the extracted network criteria, a second channel based on the priority of different channels and cause the repeater to reconfigure to relay data signals between a second base station and the handset using the second channel, the second channel including a frequency band.

2. The system of claim 1, wherein the network criteria includes a cell reselection priority value.

3. The system of claim 1, wherein the network criteria includes cell selection criteria broadcast by the network to the handset.

4. The system of claim 3, wherein the network criteria includes global system for mobile communication (GSM) enhanced data rates for GSM evolution (EDGE) radio access network (GERAN) frequencies and/or GERAN neighbor cell frequencies contained within a system information block (SIB) message 7.

5. The system of claim 1, wherein the network criteria includes cell reselection criteria broadcast by the network to the handset.

6. The system of claim 5, wherein the network criteria information includes inter frequency neighbor information contained within system information block (SIB) message 5.

7. The system of claim 5, wherein the network criteria information includes cell reselection priority and/or intrafrequency cell reselection information contained within a system information block (SIB) message 3.

8. The system of claim 1, the repeater further comprising a radio frequency transceiver, and wherein the repeater is configured to measure, by the radio frequency transceiver, signal strengths associated with the different channels, wherein the determining is further based on the measured signal strengths.

9. The system of claim 1, wherein the network criteria is broadcast from a base station for reception by the handset over a logical channel broadcast control channel (BCCH), transport channel broadcast channel (BCH), or downlink shared channel (DL-SCH).

10. The system of claim 1, wherein the determining includes executing, by the repeater, a handset cell reselection procedure using the extracted network criteria.

11. The system of claim 1, wherein the data processor is further configured to identify cells and frequency bands available for repeating by the repeater, and measure, by a radio frequency transceiver, signal strengths associated with the different channels;
wherein the determining includes executing, by the data processor, a handset cell reselection procedure for each of the identified available cells and each of the identified available frequency bands, the executing using at least the extracted network criteria, the measured signal strengths, and signal quality measures.

12. The system of claim 11, wherein the determining further includes ranking the identified cells according to results of the cell reselection procedure executions, constructing a list of frequency bands prioritized according to the ranked identified cells; and selecting a frequency band within the list of frequency bands as the second channel.

* * * * *